United States Patent [19]

Hallden-Abberton

[11] Patent Number: 5,232,985
[45] Date of Patent: Aug. 3, 1993

[54] GRAFT COPOLYMERS AND A PROCESS FOR THEIR PREPARATION

[75] Inventor: Michael P. Hallden-Abberton, Maple Glen, Pa.

[73] Assignee: Rohm and Haas Company, Philadelphia, Pa.

[21] Appl. No.: 772,522

[22] Filed: Oct. 7, 1991

Related U.S. Application Data

[62] Division of Ser. No. 380,848, Jul. 17, 1989, Pat. No. 5,084,517.

[51] Int. Cl.$^5$ ............................................. C08L 77/00
[52] U.S. Cl. ..................................... 525/66; 525/69; 525/183
[58] Field of Search ............................ 525/69, 183, 66

[56] References Cited

U.S. PATENT DOCUMENTS

| Re. 30,322 | 7/1980 | Hammer et al. | 525/66 |
|---|---|---|---|
| Re. 30,754 | 9/1981 | Hamer et al. | 525/66 |
| 3,668,274 | 6/1972 | Owens et al. | 525/66 |
| 3,796,771 | 3/1974 | Owens et al. | 525/66 |
| 3,976,720 | 4/1976 | Hammer et al. | 525/66 |
| 3,984,497 | 10/1976 | Owens et al. | 525/66 |
| 4,086,300 | 4/1978 | Owens et al. | 525/66 |
| 4,148,846 | 4/1979 | Owens et al. | 525/66 |
| 4,167,505 | 9/1979 | Dunkelberger | 260/37 N |
| 4,246,374 | 1/1981 | Kopchik | 523/329 |
| 4,410,661 | 10/1983 | Pagilagan et al. | 525/66 |
| 4,415,706 | 11/1983 | Staas | 525/183 |
| 4,727,117 | 2/1988 | Hallden-Abberton et al. | 525/343 |

FOREIGN PATENT DOCUMENTS

| 0094215 | 11/1983 | European Pat. Off. . |
|---|---|---|
| 3730757 | 11/1983 | European Pat. Off. . |
| 59-25836 | 2/1984 | Japan . |
| 62-96551 | 5/1987 | Japan . |
| 1558877 | 1/1980 | United Kingdom . |
| 2207139 | 1/1989 | United Kingdom . |

OTHER PUBLICATIONS

Publication-"XTHA Polymers for Nylon", Freed and Cohen, Nov. 18, 1985.
Publication-"Use of XHTA Polymers to Formulate Nylon Alloys", Rohm and Haas Company, undated.
Paper-"Extra High Temperature Acrylics and Their Alloying Potential", LC Sederal.

*Primary Examiner*—Ana L. Carrillo
*Attorney, Agent, or Firm*—Roger K. Graham

[57] ABSTRACT

Higher yields of graft copolymer occur when a catalytic amount of base is present during the grafting reaction. The resulting blends of ungrafted polymer with higher graft-copolymer content exhibit improved toughness and clarity.

32 Claims, No Drawings

GRAFT COPOLYMERS AND A PROCESS FOR THEIR PREPARATION

This is a divisional of U.S. application Ser. No. 380,848, filed Jul. 17, 1989 U.S. Pat. No. 5,084,517.

FIELD OF THE INVENTION

This invention relates to novel graft copolymer compositions and a method of preparing them. It more specifically relates to ionomers of polyamide-grafted poly(glutarimide) and a method of preparing them in the presence of a basic catalyst.

BACKGROUND OF THE INVENTION

It is known to admix poly(glutarimides), especially those having residual acid and/or anhydride groups, and polyamides to prepare useful materials. It is further known to add impact-strength modifiers to such blends. It is further known to blend polyamides with poly(olefins) containing amine-reactive functional groups, and to blend polyamides with core/shell impact-strength modifiers containing amine-reactive functional groups in the shell.

Since the earlier discovery of thermally stable poly(glutarimides) and a process for their preparation by reacting an acrylic polymer with anhydrous ammonia or an anhydrous primary amine in a devolatilizing extruder, such polymers, especially those prepared by the treatment of poly(methyl methacrylate) with monomethylamine, have been employed as clear glazing or protective materials having acceptable impact strength and tensile modulus properties and a higher service temperature than most clear thermoplastics. Such poly(glutarimides) are also useful in blends with other thermoplastics, such as poly(vinyl chloride). Although the formation of graft copolymers upon admixture in the melt of such polyamides and poly(glutarimides) is not taught, I have discovered evidence that such graft formation occurs.

An object of the present invention is deliberately to prepare graft copolymers of polyamides and poly(glutarimides), and further to increase the efficiency of the grafting process to form a high percentage of graft copolymer with respect to the ungrafted polyamide and poly(glutarimide). A further object is to prepare polyamide-grafted poly(glutarimide) ionomers and clear, tough polymer blends of polyamides, poly(glutarimides) and polyamide-grafted poly(glutarimide) ionomers. Further objects of the invention will be apparent from the following specification and claims.

SUMMARY OF THE INVENTION

I have discovered polyamide-grafted poly(glutarimide) ionomers and compositions of these ionomers blended with ungrafted or unreacted polyamide and poly(glutarimide) which form tough, clear thermoplastic materials having resistance to stress-whitening. I have further discovered a process by which polyamides containing one or more terminal or pendant primary aliphatic amine groups react in the melt with a poly(glutarimide) containing acid and/or anhydride groups in the presence of a basic catalyst to produce these polyamide-grafted poly(glutarimide) ionomers at high efficiency.

DETAILED DESCRIPTION OF THE INVENTION

In the present invention, the term poly(glutarimide) refers to a polymer which contains at least 5 weight percent, preferably more than about 50 weight percent, and preferably up to about 95 weight percent, of mers of the cyclic structure N-alkylglutarimide, N-cycloalkylglutarimide, or N-hydrogenglutarimide, where alkyl refers to alkyl groups containing one to eight carbon atoms and cycloalkyl groups containing three to eight carbon atoms.

The term "mer" as used herein means a combination of elements which when polymerized form a single repeating unit in a polymer. Thus the monomer ethylene, $(C_2H_4)$ or $CH_2=CH_2$, becomes the mer ethylene, $(-CH_2-CH_2-)$, in poly(ethylene), even though the ethylenic double bond is no longer present in the polymer. The mer may be hypothetical, as in a vinyl alcohol mer present in hydrolyzed poly(vinyl acetate). More than one kind of mer is present in a copolymer. Mers may be formed by post-reaction on a polymer, such as in an N-methyldimethylglutarimide mer formed by the addition of methylamine to two neighboring mers of methyl methacrylate accompanied by the loss of two molecules of methanol.

By polymers containing mers of N-alkylglutarimide is meant polymers with mers of the structure

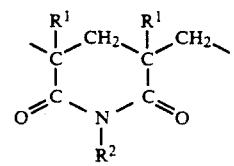

where $R^1$ is H or methyl, and $R^2$ is hydrogen, n-, sec- or iso-alkyl; cycloalkyl, such as cyclohexyl; aryl; alkaryl or aralkyl, the alkyl group containing 1-8 carbon atoms. Preferred for $R^1$ and $R^2$ is methyl.

The term "(meth)acrylate" as used herein means acrylate and/or methacrylate. For example, methyl (meth)acrylate means methyl acrylate and/or methyl methacrylate.

The term "ionomer" as used herein means a copolymer containing mers which have groups bearing a positive or negative charge, the charged groups being associated with non-polymeric counter-ions. The polyamide-grafted poly(glutarimide) ionomer contains ionomeric groups attached to the backbone of the poly(glutarimide); these take the form of carboxylic anions associated with alkali metal or alkaline earth cations. The term "polyamide-grafted poly(glutarimide) ionomer" as used herein refers to a polymer having a backbone containing N-alkylglutarimide mers and mers having carboxylic anion groups, to which backbone is grafted the polyamides described below. As may be seen from the structure above, the backbone itself is essentially a polymer of methylene groups; in addition to the (N-alkyl)glutarimide and carboxylic group mers present on this backbone, (meth)acrylic ester mers and mers of glutaric anhydride may also be present.

In the preparation of poly(glutarimides), whether from polymers having mers of methyl methacrylate, methacrylic acid, or methacrylic anhydride, it is difficult to avoid forming or retaining a low percentage of mers of methacrylic acid or anhydride. Processes to remove such groups, as for example by a post-polymerization acylation or alkylation reaction to reduce acid content in the poly(glutarimides), have led to poly(glutarimides) of generally improved chemical miscibility; a significant exception is that the non-acid-reduced poly(glutarimides) are more miscible with polyamides such as nylon 6. Such poly(glutarimides) are referred to herein as acid-reduced poly(glutarimides). In the present invention, the use of non-acid reduced poly(glutarimides) is preferred.

The reaction of an acrylic polymer with anhydrous ammonia or an anhydrous primary amine in a devolatilizing extruder is preferred for preparing such glutarimide polymers, but other preparative methods known to the art may be employed, such as by the reaction in aqueous or non-aqueous solutions of poly(methyl methacrylate) with an amine, by the reaction of a poly(methacrylic acid) with an amine under devolatilizing conditions, or by the reaction of a poly(glutaric anhydride) with an amine. Other mers may be present in the glutarimide polymer, such as mers of the alkyl or cycloalkyl methacrylate from which the poly(glutarimide) was prepared. Other mers may be present in the starting polymer, such as styrene or an alkyl acrylate. If methods other than the preferred one are used, mers of methacrylic acid and/or methacrylic anhydride may be present as unimidized components from the starting material. Other mers are formed during the preparation of the poly(glutarimide), such as N-alkylmethacrylamide mers, methacrylic acid mers, or mers of methacrylic anhydride. Such formed-in-situ or residual mers need not be removed or converted to ester or other functionality, as by the above-described post-polymerization reaction to form acid-reduced poly(glutarimides), in preparing the blends of the present invention. Indeed, it is preferred that they not be completely removed. Partially acid-reduced polymers, having some controlled level of residual acid and/or anhydride, are also useful, as are blends of poly(glutarimides).

The poly(glutarimides) may be formed by reacting a polymer such as poly(methyl methacrylate) or poly(methyl acrylate) with a variety of amines; preferred in the present invention are those glutarimide polymers prepared from primary N-alkylamines of eight or fewer carbon atoms, such as methylamine, ethylamine, propylamine, n-butylamine, isobutylamine, or n-octylamine, from cycloalkyl amines such as cyclopentyl or cyclohexyl amine, from ammonia or ammonia precursors such as urea, or from aniline, aralkylamines and alkarylamines. Preferred is the polymer prepared from monomethylamine or other materials which yield the same mer, as for example, N-methyldimethylglutarimide.

Experience in preparing poly(glutarimides) by reacting poly(methyl methacrylate) and methylamine in a devolatilizing extruder has shown that conversion to a polymer having a Vicat softening point of about 150° C. produces more anhydride than conversion to a polymer having a Vicat softening point of about 170° C., even though the total acid content is about the same or lower. The level of acid and/or anhydride produced over a range of imidization levels from about 5 to about 95% will produce a sufficient number of grafting sites to cause increased levels of graft polymerization when reacted with a polyamide under the catalyzed reaction conditions described herein.

Essentially no grafting is seen when the acid/anhydride content of the poly(glutarimide) is below about 0.015 mmol/g of poly(glutarimide). For acid/anhydride content from about 0.015 mmol/g to about 0.15 mmol/g, some grafting is observed at the higher level of catalyst employed (500 ppm of base). Preferred for the catalyzed preparation of graft polymer is a poly(glutarimide) containing from about 0.15 to about 1.50 mmol/g of acid mers and from about 0.00 to 1.20 mmol/g of anhydride mers. Higher levels may be employed but are expected to show no advantage and to possibly be deleterious to the physical or chemical properties of the blend containing graft copolymer.

The total acid and anhydride functionality may be determined by titrating solutions of the polymers in 1:1 methylene dichloride-methanol. A sample of the polymer is dissolved and treated with a measured volume of 0.1N sodium hydroxide solution which contains more than enough base to neutralize the acid and hydrolyze the anhydride in the sample. The sample is stirred for sufficient time to allow the anhydride to hydrolyze, the excess base is back-titrated with hydrochloric acid solution, and the total acid and anhydride functionality is calculated as the difference, in millimoles, between the added base and the added acid to the point of neutrality. The end point of the titrations may be detected either colorimetrically or potentiometrically. This reaction is stoichiometric for acid in the polymer; anhydride groups are partially hydrolyzed such that one of the anhydride's acid groups is esterified by the methanol while the other reacts with the base. As a result of the half-esterification of the anhydride, the total acid content, as used herein, is the sum of the milliequivalents of acid and anhydride, where the anhydride contributes only one equivalent of titratable acidity per mole, instead of the two equivalents per mole expected in the absence of the half-esterification reaction.

The total acid and anhydride functionality of a copolymer or blend containing polymer components that are imidizable is calculated as millimoles per gram of the imidizable polymer components.

In the present invention, polyamide refers to polymers which contain mers of the formula

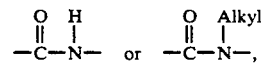

the former being preferred. The polyamide may be any of a large class of polyamides based on aliphatic, cycloaliphatic, or aromatic groups in the chain. They may be formally represented by the products of condensation of a dibasic amine with a dibasic acid, such as poly(hexamethylene adipamide), by the product of self-condensation of an amino acid, such as omega-aminoundecanoic acid, or by the product of a ring-opening reaction of a cyclic lactam, such as caprolactam, lauryllactam, or pyrrolidone. They may contain one or more alkylene, arylene, or aralkylene repeating units. The polyamide may be crystalline or amorphous. Preferred are crystalline polyamides of alkylene repeating units having from 4 to 12 carbon atoms, such as poly(caprolactam), known as nylon 6, poly(lauryllactam), known as nylon 12, poly(omega-aminoundecanoid acid), known as nylon 11, poly(hexamethylene adipamide), known as nylon 6.6, poly(hexamethylene sebacamide), known as nylon 6.10, and alkylene/arylene copolyamides such as that made from meta-xylylene diamine and adipic acid (nylon MXD6). However, amorphous polyamides, such as those derived from isophoronediamine or trimethylcyclohexanediamine, may be utilized. Blends of polyamides may be utilized. Especially preferred are poly(hexamethylene adipamide) and poly(caprolactam).

Polyamides will have, unless specially polymerized in the presence of excess acid or post-reacted, one or more terminal amine groups. Under certain conditions, such as polycondensation in the presence of a slight excess of diamine, both end groups may be amine-substituted. In polyamides having a low but controlled degree of branching, such as by use of a slight excess of a aliphatic triamine, there may be more than two amine groups available per polyamide chain. Such polyamides containing one or more terminal amine groups are preferred for the present invention.

Although the present invention is mainly directed to basic catalysis of the reaction of amine-terminated polyamides with poly(glutarimides) containing acid or anhydride functionality, other polymers which can be melt-blended with the polyamide and which contain a reactive functional group or groups may be employed with catalysis of the reaction which leads to graft copolymer formation. Such polymers may include, among others, polymers containing mers of methyl methacrylate and methacrylic anhydride, such as those conveniently formed by reacting acrylic ester polymers with secondary amines at elevated temperatures, polymers containing mers of methyl methacrylate and mers of a reactive acid, such as methacrylic acid, itaconic acid, methacryloxypropionic acid, acryloxypropionic acid, and the like, polymers containing mers of methyl methacrylate and glycidyl methacrylate, polymers containing mers of methyl methacrylate and maleic anhydride, or polymers containing mers of styrene, acrylonitrile, and maleic anhydride, and the like.

The following theoretical discussion is offered only as an aid to understanding the invention; I wish not to be bound by the theory set forth. Although it was not recognized by previous investigators of non-acid-reduced poly(glutarimide), a grafting reaction occurs when the poly(glutarimide) and polyamide are mixed in an extruder heated to temperatures above about 240° C., in the absence of any added catalyst. This reaction produces a graft copolymer, but it yields relatively inefficient conversion of ungrafted polymer to grafted copolymer. Almost surely the reaction to form the graft copolymer involves the formation of a new amide bond from the acid and/or anhydride groups of the original poly(glutarimide) with the terminal primary amine group(s) of the polyamide. Evidence that the acid and/or anhydride groups are involved is found when one examines the co-extruded blends of the acid-reduced poly(glutarimide) with nylon 6, i.e., poly(caprolactam). Solvent separation produces evidence of little or no graft polymer being formed, even in the presence of small amounts of a strongly basic catalyst.

Addition of small amounts of strongly basic catalyst such as alkali and alkaline earth hydroxides causes formation of ionomeric groups on the poly(glutarimide), either by direct reaction with the carboxylic acid groups on the non-acid-reduced polymer, or by hydrolyzing the anhydride groups and reacting with the resulting carboxylic acid groups. The presence of the basic catalyst facilitates the reaction of the poly(glutarimide) and polyamide to form grafted polymer, freeing the strongly basic catalyst to form another ionomeric group. The final graft copolymer will contain ionomeric groups because the grafting reaction would not be expected to eliminate all acid and anhydride at the reaction conditions contemplated within the present invention.

Again wishing not to be bound by theory, I believe that the presence of the ionomeric group facilitates formation of the amide graft between the polyamide terminal amine and the poly(glutarimide) carboxylic group, thus allowing more such grafts to form when the catalyst is present than when it is absent, and leading to a more efficient conversion of ungrafted polymer to grafted copolymer.

The present process for preparing a polyamide-grafted poly(glutarimide) ionomer containing at least 5 weight percent of mers of N-lower alkylglutarimide comprises reacting a polyamide and a poly(glutarimide) at elevated temperature in the presence of a catalytic amount of a base, to form the polyamide-grafted poly(glutarimide) ionomer. The polyamide and poly(glutarimide) may be melted and blended together, or they may be partially or completely dissolved, suspended or swollen and mixed together in a solvent, suspension medium or swelling agent. Subsequent to formation of the polyamide-grafted poly(glutarimide) ionomer, the polymers are subjected to devolatilizing conditions to form a polymer blend comprising the polyamide-grafted poly(glutarimide), ungrafted polyamide and ungrafted poly(glutarimide).

Preferably the polyamide has at least one terminal or pendant primary amine group, and preferably the poly(glutarimide) contains at least 5 weight percent of mers of N-lower alkylglutarimide, and at least 0.015 mmol/g of one or more of mers selected from the group consisting of methacrylic anhydride, acrylic anhydride, mixed methacrylic-acrylic anhydride, acrylic acid, and (meth)acrylic acid.

In the present process the polyamide and poly(glutarimide) may be reacted in a ratio of from about 95:5 to about 5:95 polyamide:poly(glutarimide). A preferred range for this ratio is from about 90:10 to about 30:70, and a more preferred range is from about 85:15 to about 40:60. A preferred temperature range for the reaction where the polymers are melted and blended together is from about 240° C. to about 350° C. A more preferred temperature range for achieving reaction in a time commensurate with reasonable processing speed is from about 260° C. to about 320° C. If the polymers are mixed in solution, suspension or the swollen state, temperatures from about 100° to about 350° C. are preferred. Pressures from about 1 to about 150 atmospheres may be employed, pressures toward the higher end of the range being especially preferred to maintain the solvent or suspending medium in the liquid state when temperatures toward the higher end of the range are employed.

In a preferred process, the polyamide and the poly(glutarimide) are melted together in a devolatilizing extruder at the above conditions. In another preferred process the polyamide and the poly(glutarimide) are dissolved in a solvent, either separately and subsequently mixed, or they are dissolved together; the solution is heated to the temperatures, and at the pressures, set forth above, and agitated for a length of time commensurate with the degree of reaction desired, after which the solvent is removed. A preferred method for removing the solvent is to pass the solution through a devolatilizing extruder.

Where solvents are used in the process of the present invention, they are preferably selected to dissolve or swell the polymers, and to remain in the liquid state, at the temperature and pressure selected, and further to be inert to the grafting reaction occurring in the present process, or to any other undesirable reaction. Typical solvents include $C_1$-$C_8$ aliphatic alcohols such as methyl, ethyl, isopropyl, butyl, hexyl, cyclohexyl and octyl alcohols, aromatic alcohols such as cresol, aromatic hydrocarbons such as benzene, toluene and xylene, ethers such as glyme, diglyme and higher glymes, dioxane and tetrahydrofuran, other solvents such as dimethylformamide, dimethylsulfoxide and dimethylacetamide, and mixtures of these solvents. Other suitable solvents will readily occur to those skilled in the art.

The catalyst for the reaction is a base, and is used in amounts from about 100 to 10,000 parts per million (ppm), preferably from about 200 to about 1000 ppm, based on the total amount of polymer present. Strong bases are preferred; such strong bases include the alkali and alkaline earth hydroxides, such as sodium, potassium, lithium, calcium or magnesium hydroxides, or tetrasubstituted ammonium or phosphonium hydroxides, such as tetramethylammonium hydroxide, stearyltrimethylammonium hydroxide, tetramethylphosphonium hydroxide, and the like. Preferred is sodium hydroxide. The base may be introduced into the reaction system in aqueous or alcoholic solution or suspension, as the water or alcohol will be removed by devolatilization. A concentrated solution or suspension is preferred. The base may be added to one of the components prior to introduction into the mixing apparatus, or it may be introduced separately, or in other ways apparent to one skilled in the art. Mixtures of bases may be used. The ionomer which forms when the strong base reacts with carboxylic acid sites in the polymer will be present in an amount equivalent to the amount of base added; thus the preferred ionomer content of the polyamide-grafted poly(glutarimide) ionomer of the present invention, when the strong base is the preferred sodium hydroxide, is from about 0.0025 to about 0.25 millimoles per gram, and more preferably from about 0.005 to about 0.025 millimoles per gram, of the total polymer.

Since the extent of grafting which occurs under non-catalyzed conditions will vary with the nature of poly(glutarimide) and polyamide used, plus the reaction conditions, it is difficult to define to what absolute level the catalyzed reaction may be driven. As illustrated in the examples, both nylon 6 and nylon 6.6 polymers in admixture with two different poly(glutarimides) of differing acid and anhydride content may be driven to significantly higher conversion of grafted ionomer by the use of levels of sodium hydroxide no higher than 500 ppm.

Thus, with a poly(caprolactam) and a poly(glutarimide) containing less than 0.3 mmol/g but more than about 0.015 mmol/g of acid or anhydride functionality, reaction in the presence of base produces a blend of polyamide, poly(glutarimide), and at least five weight percent of the corresponding polyamide-grafted poly(glutarimide) ionomer. When the level of acid/anhydride in the poly(glutarimide) is above 0.3 mmol/g, reaction in the presence of base produces a blend of polyamide, poly(glutarimide), and at least 35 weight percent of the corresponding polyamide-grafted poly(glutarimide) ionomer.

The result of the reaction is a polymer blend comprising the polyamide-grafted poly(glutarimide) ionomer, unreacted polyamide, and ungrafted poly(glutarimide). Particularly advantageous in the present reaction is that the grafting reaction produces a significantly higher level of the grafted ionomer than the level of graft copolymer formed when the polyamide and poly(glutarimide) react in the absence of the catalyst. The amount of polyamide-grafted poly(glutarimide) ionomer in the blend is preferably from about 5 to about 95% by weight of the blend, where the polyamide and poly(glutarimide) are reacted in a ratio of from about 5:95 to about 95:5 polyamide:poly(glutarimide). More preferably the amount of polyamide-grafted poly(glutarimide) ionomer is from about 30 to about 90% where the polyamide and poly(glutarimide) are reacted in a ratio of from about 30:70 to about 90:10 polyamide:polyglutarimide, and still more preferably the amount of polyamide-grafted poly(glutarimide) ionomer is from about 40 to about 80% where the polyamide and poly(glutarimide) are reacted in a ratio of from about 40:60 to about 85:15 polyamide:polyglutarimide.

It should be noted that, when thermally decomposable bases are used as the catalyst, such as the tetrasubstituted ammonium hydroxide, the ionomer formed may well be broken down during subsequent heating of the polymer blend to form ammonia or a volatile amine, which would be removed during a devolatilization process, and a non-ionomeric polymer blend. The process by which such a non-ionomeric blend is made is contemplated to be within the scope of the present invention.

With a poly(hexamethylene adipamide) and a poly(glutarimide) containing less than 0.30 mmol/g but more than about 0.015 mmol/g of acid or anhydride functionality, reaction in the presence of base produces a blend of polyamide, poly(glutarimide), and at least 15 weight percent of the corresponding polyamide-grafted poly(glutarimide) ionomer. When the level of acid/anhydride in the poly(glutarimide) is above 0.30 mmol/g, reaction in the presence of base produces a blend of polyamide, poly(glutarimide), and at least 50 weight percent of the corresponding polyamide-grafted poly(glutarimide) ionomer.

The individual reactants in the process of the present invention may contain additives normally found in such materials when purchased commercially. Thus, the polyamide and/or the poly(glutarimide) may contain one or more thermal stabilizers, such as antioxidants, heat stabilizers, ultraviolet stabilizers, and the like. They may further contain lubricants, mold release agents, flame retardants, and the like. Additives may also be introduced into the melted blend during processing, including prior to, during, or after the reaction of the polyamide end groups, for the purpose of modifying useful properties of the blend. Inert fillers, such as glass in strand or chopped form, wollastonite, mica, talc, carbon black, and the like, may also be incorporated into the blend of the present invention as described above for other additives.

Especially useful as such additives will be impact-strength modifiers. These impact-strength modifiers for both poly(glutarimides) and for polyamides are well known to the art, and any of these may be used. Particularly effective in modifying polyamides, especially those with reactive amine groups, are functionalized poly(olefins), such as poly(ethylene) or ethylene-propylene copolymers to which have been grafted acidic functionality or groups that hydrolyze to acids, such as maleic anhydride or unsaturated acids. However, for best effectiveness and highest impact-strength values, unreacted amine groups are present in the polyamide/poly(glutarimide)blend.

A second preferred class of impact-strength modifiers is core/shell impact-strength modifiers. For these modifiers one or more cores of rubbery polymer are prepared by emulsion, and one or more shells are polymerized in the presence of the core. The rubbery polymer is a polymer comprising primarily mers selected from butadiene and alkyl acrylates having from three to eight carbon atoms in the alkyl group. The preferred alkyl acrylate is n-butyl acrylate. The rubbery polymer may also contain a minor amount of mers of other alkyl (meth)acrylates, of vinyl aromatic monomers, such as styrene, or acrylonitrile mers. The core polymer may be crosslinked by incorporation of multifunctional monomers such as divinylbenzene, polyol esters of (meth)acrylic acid, (meth)allyl esters of (meth)acrylic acid or maleic acid, and the like. The multifunctional monomers, if present, may be effectively used at levels from about 0.05 to about 5 percent by weight of the rubbery stage. The elastomer may be formed in one or more steps, and may be formed by polymerization in the presence of a "seed" polymer to control polymer particle size; emulsion polymerization is preferred. Typical useful core polymers are copolymers of butadiene and styrene containing at least 75% butadiene, copolymers of butadiene and butyl acrylate, homopolymers of butadiene, copolymers of butadiene and acrylonitrile containing at least 70% butadiene, copolymers of butyl acrylate with up to about 20% styrene, homopolymers of 2-ethylhexyl acrylate, and the like. For polymers comprising primarily alkyl acrylate mers, the incorporation of multifunctional monomers is preferred. Preferred amounts of the multifunctional monomers are from about 0.5 to about 2% of the total polymer. Especially preferred is incorporation into the polymer of a multifunctional monomer having two or more unlike unsaturated groups, such as diallyl maleate, allyl methacrylate, and the like.

To complete these impact-strength modifiers, one or more shell polymerizations are conducted in the presence of the core polymer, preferably with chemical grafting occurring because residual double bonds are present in the core polymer. The shell comprises a majority of mers of a vinyl aromatic or alkyl or cycloalkyl methacrylate monomer, preferably styrene or methyl methacrylate. Other mers, such as those of alkyl or cycloalkyl (meth)acrylates, (meth)acrylonitrile, styrene (when styrene does not comprise the majority of mers in the shell), substituted styrenes and the like may also be present. Either the core or shell, and preferably the final shell, may also contain mers of monomers capable of reacting with the amine end group or groups of the polyamide present in the blend. Such functionality may include acid, acid halide, anhydride and the like. Preferred are mers of anhydrides, such as maleic anhydride, itaconic anhydride and the like; maleic anhydride is especially preferred. Carboxylic acid functionality is also preferred, and may include that present from mers of methacrylic acid, acrylic acid, itaconic acid, monoalkyl fumaric acid, monoalkyl maleic acid, methacryloxyacetic acid, methacryloxypropionic acid, acryloxypropionic acid, and the like.

An advantage of the present invention is that the higher degree of grafting between poly(glutarimide) and polyamide will allow non-functionalized core/shell impact-strength modifiers with shells compatible with the poly(glutarimide) to disperse more readily in the reacted blend. This improved dispersion enhances the impact-strength improvement of the modifier, and eliminates the need for controlling stoichiometry to leave amine groups for reaction with amine-reactive functionalization in the shell.

Many of the impact-strength modifiers useful in the present invention are soft materials and difficult to isolate in free-flowing powdery form. To aid in the isolation, spray-drying additives or coagulation additives, such as finely divided silica, stearate-coated calcium carbonate, and the like may be added to the impact-strength modifier before, during, or after isolation at levels from about 0.5 to about 5 percent, preferably from about 0.5 to about 2 percent. Polymeric additives such as poly(methyl methacrylate), at levels from about 1 to about 5 percent, also may be incorporated as isolation aids.

The individual components of the reaction mixture may be blended together by mixing the polymer powders and pellets, such as by tumbling, drum mixing, and the like, or they may be compounded as a melt using such equipment as mill rolls. Appropriate methods of blending the components will be apparent to those skilled in the art. The blend thus formed is caused to react by melting the components, blending them in the melt and removing any water liberated during the reaction. A single- or twin-screw extruder is preferred for this operation, but other appropriate equipment will be apparent to those skilled in the art. The reacted polymer-ionomer blend may be pelletized for later processing, or it may be fed in molten form directly to a separate zone or zones suitable for injection molding or extrusion. If twin-screw extruders are used, they may be counter- or co-rotating. The screws may be tangential or intermeshed. The extruder is preferably equipped with at least one devolatilizing vent, and it is further preferred to apply vacuum at that vent to remove water from the condensation reaction. The temperature of processing may be from about 230° C. (if all components are molten at that temperature) to about 350° C., although the reaction may be conducted outside that range for certain polyamides and poly(glutarimides), more preferred is from about 260° C. to about 320° C.

The polymer-ionomer blend of the present invention may be formed, as by molding or extruding, into many useful objects such as automotive parts, computer housings, appliance housings, tough films, and the like. The reacted blend is especially useful in producing blow-molded articles, such as bottles, fuel tanks, automotive bumpers, and the like, which cannot be readily prepared from polyamides. These blow-molded objects have a useful balance of toughness, tensile modulus, and heat distortion temperature. Such articles may be made by either injection blow molding or extrusion blow molding. Other uses for the polymer-ionomer blend include heat-resistant and solvent-resistant engineering thermoplastics, optical fibers, optical recording media, medical devices, photoresist materials, electrical insulators and food packaging. They may be processed into sheet, film, rod, profile, or complex parts by any known plastics processing technique, and can be painted, dyed, decorated, metallized, or coated with abrasion resistant coatings.

The polymer-ionomer blend of the present invention may also be formed into films and sheets which are useful in applications such as packaging. Some advantages of these films include clarity, toughness and good barrier properties to gases such as water vapor, carbon dioxide and oxygen.

The polymer-ionomer blends of the present invention have a higher degree of clarity and a slower rate of crystallization of the polyamide components, and exhibit greater toughness, than do polymer blends prepared in the absence of a basic catalyst. Differential scanning calorimetry analyses have shown that the polymer-ionomer blends of the present invention possess a crystallization temperature that is significantly lower than that of blends prepared in the absence of the basic catalyst. For a given polyamide, clearer films can be compression molded from the present blends; higher haze is seen in the films from the polymer blends prepared in the absence of a basic catalyst. In addition, higher tensile ductility is seen in the films prepared from the polymer-ionomer blends of the present invention.

The following examples are intended merely to illustrate the present invention and not to limit it in any way. All percentages are by weight unless otherwise specified, and all reagents are of good commercial quality unless otherwise specified.

EXAMPLES

A. Polymer Preparations

All of the polymers containing mers of N-methyl-dimethylglutarimide and mers of methacrylic acid were prepared by imidizing acrylic polymers with methylamine in a 5-cm-diameter, twin-screw, counter-rotating, tangential, devolatilizing extruder. Those control samples for which the acid and/or anhydride content was reduced were further reacted, in a subsequent zone of the same extruder, with dimethylcarbonate. The compositions of the poly(glutarimides) used in the following examples are listed in Table I. There were no additives incorporated after imidization and prior to use in the grafting reactions.

Grafting reactions were carried out with poly(glutarimides) A-D (Table 1) and poly(caprolactam) homopolymer, otherwise designated nylon 6 (Capron 8202, obtained from Allied Chemical, now Allied-Signal Plastics & Performance Materials Division, Morristown, N.J.) as well as with poly(hexamethylene adipamide), otherwise known as nylon 6.6 (Zytel 101, obtained from E. I. DuPont de Nemours & Co., Inc., Wilmington, Del.). The terms nylon-6 or nylon 6.6 are employed herein for convenience. All mixtures were 50/50 (weight/weight) polyamide/poly(glutarimide). Prior to extrusion grafting, the desired amount of NaOH catalyst was introduced to the blend by coating it onto the poly(glutarimide) pellets in the following manner. The appropriate amount of reagent grade NaOH was dissolved in methanol solvent spectrophotometric grade), the solution was added to poly(glutarimide) pellets in a rotary evaporator, and the solvent was removed with continuous rotation under vacuum until the free-flowing poly(glutarimide) pellets were evenly coated with a thin NaOH film. The pellets were dried at 50° C. under vacuum for 16 hours, and were then mixed with additional virgin poly(glutarimide) and nylon pellets; the mixed pellets were stored in poly(ethylene) bags prior to extrusion.

This mixture was fed, at a rate of 80.0 g/min, into a 62.5-L/D (length/diameter), 2.0-cm Welding Engineers twin-screw, counter-rotating extruder (obtained from Welding Engineers, Inc., Blue Bell, Pa.) operating at a screw speed of 500 rpm, with the reaction zone set to a temperature of 275° C. The extruder had three vents, all run under full vacuum. Samples were extruded as strands and cut into pellets prior to molding or analysis for grafting.

B. Polymer Testing

The blends of polyamide, poly(glutarimide) and polyamide-grafted poly(glutarimide) ionomer or non-ionomeric polyamide-poly(glutarimide) copolymer (for the controls) were analyzed for extent of grafting by the following method:

A $0.400 \pm 0.001$ g sample of the reacted polymer blend is dissolved in 50 ml of 85/15: m-cresol/methanol (v/v) with stirring at room temperature (the more highly grafted samples took as much as 3 days to dissolve). The polymer solution is then slowly added to 300 ml of rapidly stirred acetone at room temperature. The flocculated precipitate is then filtered using a fine (4–8 μm) fritted glass filter, and washed with four 15-ml portions of acetone. This precipitated polymer (Fraction "A") is carefully removed and weighed after drying at 140° C. for 16 hours (no cresol odor should be present).

The empty filter is washed with three 10-ml portions of acetone; these washes are combined with the previous cresol solution and washes. This solution is concentrated on a rotary evaporator at 70° C. to a volume of about 55 ml. The concentrate is cooled to room temperature and then added slowly to a rapidly stirred, mixed solvent consisting of 400 ml methanol and 100 ml petroleum ether (obtained from Aldrich Chemical Co., Milwaukee, Wis., bp. 30°–60° C.) chilled to about 3° C. For examples involving poly(glutarimide) "B", this solvent consisted only of 250 ml of room-temperature petroleum ether. The fine precipitate ("B0.1") is next filtered off with a fine fritted glass filter, and washed twice with 25 ml methanol prior to drying at 140° C. for 16 hours. The empty filter funnel is washed with acetone by adding about 15 ml of acetone to the filter over 5 minutes prior to applying vacuum and collecting the acetone in a clean filter flask. This is repeated. The acetone solution is placed into a tared aluminum pan, evaporated, then dried as above ("B0.2"). The B solids are combined to give a total "B" fraction sample. This latter procedure is required to remove all fractionated poly(glutarimide) from the surface of the filter.

Subsequent spectroscopic analysis of fractions "A" reveal it to contain almost all of the polyamide, both grafted and ungrafted, whereas fraction "B", containing the ungrafted poly(glutarimide), contains almost no polyamide. Re-precipitation of fraction "A" shows the same composition (no co-precipitation), and spectroscopic analysis shows the same level of grafted poly(glutarimide) predicted from the mass balance calculations below.

Calculations for the percentage of poly(glutarimide) to which the polyamide is grafted and the percentage of ungrafted poly(glutarimide) were all performed without renormalizing the data, and grafting percentages are based on deviations from the theoretical 50% recovery levels anticipated from the original blend compositions (in the absence of grafting reaction). An example of a 50/50-poly(glutarimide)/nylon 6 sample follows in which 27% of the poly(glutarimide) is grafted to nylon 6 follows:

% Recovery "A"=100 (Weight Fraction "A"/Original Sample Weight)

% Recovery "A" = 100 (Weight Fraction "B"/Original Sample Weight)

% poly(glutarimide) grafted to nylon = (100(% Recovery "A" − 50.0%))/50.0%

Example:
% Rec "A" = 63.3%, % Rec "B" = 32.1%
% poly(glutarimide) grafted to nylon = (100(63.3-50))/50
% poly(glutarimide) grafted to nylon = 26.6%

The acid levels in the poly(glutarimides) described below were determined by titration of a 0.15±0.05 g sample of poly(glutarimide) in 75 ml of 1/1 methylene dichloride (MDC)/methanol by adding an excess of NaOH to the polymer solution to hydrolyze all anhydride, followed by back titration of the solution with 0.1N HCl. The total acid level was taken as the difference between the meq NaOH added and the meq of HCl to neutrality per gram of sample, minus a small blank correction. The titration was followed colorimetrically or potentiometrically.

Infrared spectra were obtained from solvent-cast films on potassium bromide plates.

TABLE I

| Poly(glutarimide) Type | GPC Mol. Wt. (Weight Ave) | mmol/g of titrable acidity[1] | Weight % Nitrogen (%)[2] |
|---|---|---|---|
| A | 133,000 | 0.496 | 5.97 |
| B | 138,000 | 0.701 | 7.31 |
| C | 129,000 | 0.030 | 6.10 |
| D | 126,000 | 0.015 | 7.50 | equipped with a feed zone of 19.25 length/diameter ratio (L/D), followed by two zones consisting of a melt compounding element and a vented devolatilizing zone of 12.0 L/D each, then a final melt compounding element and vented zone of 10.5 L/D. All vented zones were run under full vacuum. The polymer blend then was pumped through a short metering zone (8.75 L/D) and out through a die where it was stranded, cooled and pelletized. A range of sodium hydroxide concentrations from 0 to 500 ppm was used. The percent of poly(glutarimide) to which the polyamide was grafted was determined by the solvent extraction technique described above. Example 5 is a control extraction of a solvent-mixed, non-extruded blend of the two polymers. Example 5 shows that the fractionation test for the percentage of grafted poly(glutarimide) fraction "A" is accurate to within about 2% (0% grafting is assumed), and that the value for the percentage of ungrafted poly(glutarimide) from fraction "B" is slightly less accurate (100% ungrafted poly(glutarimide) is assumed) since it is more difficult to quantitatively precipitate from solution. Overall material recovery was good for all fractionations reported below.

Examination of the extruded strands produced from the ionomer blends of Examples 2, 3, and 4 showed them to be tougher and optically clearer than the strands produced from the polymer blend of Example 1. These materials were compression molded into films which also showed higher clarity for the catalyzed materials (see Table II). In Tables following, the term PGI means poly(glutarimide).

TABLE II

| Example No. | NaOH (ppm) | % PGI Grafted to nylon (%)[1] | % Un-Grafted PGI (%)[2] | % Total Recovery ("A" + "B") (%)[3] | Film Thickness, mm. | % Haze (%)[4] | % TWLT (%)[4] |
|---|---|---|---|---|---|---|---|
| 1⁻ | 0 | 27 | 64 | 95.4 | 0.135 | 14.3 | 91.6 |
| 2 | 125 | 33 | 54 | 93.5 | 0.114 | 1.2 | 93.3 |
| 3 | 250 | 35 | 59 | 96.9 | 0.122 | 1.1 | 93.2 |
| 4 | 500 | 41 | 51 | 95.9 | 0.155 | 1.6 | 93.1 |
| 5* | 0 | 1.9 +/− 1.2 | 93.1 +/− 4.0 | 97.5 +/− 2.6 | — | — | — |

⁻Denotes comparative example.
[1]Percent poly(glutarimide) A to which nylon 6 was grafted (by fractionation, "A" data).
[2]Percent ungrafted poly(glutarimide) A (by fractionation, "B" data).
[3]Percent total mass recovery ("A" + "B"). All numbers unnormalized.
[4]Percent Haze and percent Total White Light Transmittance (Gardner).
*No extrusion of blend; solvent-mixed. Average of triplicate readings.

[1]The total titrable acidity in the poly(glutarimide) in millimoles per g of sample (titration in methylene dichloride/methanol)
[2]Weight percent nitrogen from micro Kjeldahl analysis.

EXAMPLES 1 TO 5

These examples illustrate the improved extent of grafting when catalysis is employed in the reaction of an amine-terminated poly(caprolactam) with a poly(glutarimide) containing acid and anhydride groups. In this series, a 50/50 weight ratio blend of poly(glutarimide) A and nylon 6 (poly(caprolactam)) were fed at a rate of 80 g/minute into a 2-cm, tangential, counter-rotating, twin-screw extruder set at 275° C. and operating at a screw speed of 500 rpm. The extruder was

EXAMPLES 6 TO 9

These examples illustrate the improved extent of grafting when catalysis is employed in the reaction of an amine-terminated poly(caprolactam) and a second poly(glutarimide) (B) containing a higher total acidity level (acid plus anhydride groups). In this series, a 50/50 weight ratio blend of poly(glutarimide) B and the nylon 6 of Example 1 were reaction-extruded under identical conditions as in Examples 1–4 above. The percent of poly(glutarimide) to which polyamide was grafted was again determined by the solvent fractionation technique.

TABLE III

| Example No. | NaOH (ppm) | % PGI Grafted to nylon (%)[1] | % Un-Grafted PGI (%)[2] | % Total Recovery ("A" + "B") (%)[3] | Film Thickness, mm. | % Haze (%)[4] | % TWLT (%)[4] |
|---|---|---|---|---|---|---|---|
| 6⁻ | 0 | 33 | 48 | 90.8 | 0.142 | 2.3 | 93.0 |
| 7 | 125 | 43 | 39 | 91.1 | — | — | — |
| 8 | 250 | 38 | 33 | 86.1 | — | — | — |

TABLE III-continued

| Example No. | NaOH (ppm) | % PGI Grafted to nylon (%)[1] | % Un-Grafted PGI (%)[2] | % Total Recovery ("A" + "B") (%)[3] | Film Thickness, mm. | % Haze (%)[4] | % TWLT (%)[4] |
|---|---|---|---|---|---|---|---|
| 9 | 500 | 45 | 53 | 99.0 | 0.142 | 1.8 | 93.1 |

+Denotes comparative example.
[1]Percent poly(glutarimide) B to which nylon 6 was grafted (by fractionation, "A" data).
[2]Percent ungrafted poly(glutarimide) B (by fractionation, "B" data).
[3]Percent total mass recovery ("A" + "B"). All numbers unnormalized.
[4]Percent Haze and percent Total White Light Transmittance (Gardner).

EXAMPLES 10 TO 13

These examples illustrate the improved extent of grafting when catalysis is employed in the reaction of an amine-terminated poly(hexamethylene adipamide) and a poly(glutarimide) (A) containing acid and anhydride groups. In this series, a 50/50 weight ratio blend of poly(glutarimide) A and nylon 6.6 were reaction-extruded in the manner described above. The percent of poly(glutarimide) to which polyamide was grafted was determined by the solvent fractionation technique. Results are shown in Table IV. In Example 12, the fractionation test was run in duplicate.

TABLE IV

| Example No. ("A" + "B") | NaOH (ppm) | % PGI Grafted to nylon (%)[1] | % Un-Grafted PGI (%)[2] | % Total Recovery (%)[3] |
|---|---|---|---|---|
| 10+ | 0 | 37 | 51 | 94.0 |
| 11 | 125 | 48 | 40 | 93.9 |
| 12a | 250 | 59 | 33 | 95.9 |
| 12b | " | 60 | 29 | 94.8 |
| 13 | 500 | 70 | 21 | 95.2 |

+Denotes comparative example.
[1]Percent poly(glutarimide) A to which nylon 6 · 6 was grafted (by fractionation, "A" data).
[2]Percent ungrafted poly(glutarimide) A (by fractionation, "B" data).
[3]Percent total mass recovery ("A" + "B"). All numbers unnormalized.

EXAMPLES 14 TO 17

These examples illustrate the improved extent of grafting when catalysis is employed in the reaction of an amine-terminated poly(hexamethylene adipamide) and the second poly(glutarimide) (B) containing the higher total acidity level. In this series, a 50/50 weight ratio blend of poly(glutarimide) B and nylon 6.6 were reaction-extruded in the same manner as above. The percent of poly(glutarimide) to which polyamide was grafted was determined by the solvent fractionation technique. Results are shown in Table V.

TABLE V

| Example No. | NaOH (ppm) | % PGI Grafted to nylon (%)[1] | % Un-Grafted PGI (%)[2] | % Total Recovery ("A" + "B") (%)[3] | Film Thickness, mm. | % Haze (%)[4] | % TWLT (%)[4] |
|---|---|---|---|---|---|---|---|
| 14+ | 0 | 51 | 30 | 90.8 | 0.142 | 40.6 | 89.1 |
| 15 | 125 | 59 | 30 | 94.2 | — | — | — |
| 16 | 250 | 77 | 18 | 97.6 | — | — | — |
| 17 | 500 | 74 | 24 | 98.8 | 0.145 | 21.0 | 91.3 |

+Denotes comparative example.
[1]Percent poly(glutarimide) B to which nylon 6 · 6 was grafted (by fractionation, "A" data).
[2]Percent ungrafted poly(glutarimide) B (by fractionation, "B" data).
[3]Percent total mass recovery ("A" + "B"). All numbers unnormalized.
[4]Percent Haze and percent Total White Light Transmittance (Gardner).

EXAMPLES 18 TO 21

These examples illustrate two effects; the greatly reduced level of grafting seen with glutarimides containing low levels of acidity, and the necessity of using catalyst (generally at the higher levels) to effect a measurable grafting level. In this series, a 50/50 weight ratio blend of poly(glutarimide) C and the nylon 6 previously used were reaction-extruded in the same manner as above. The percent of poly(glutarimide) to which polyamide was grafted was determined by the solvent fractionation technique. The fractionation procedure was repeated on Example 21. In some samples (**) slight losses in recovery led to slight "negative grafting" levels; these samples are reported as 0% grafting within the experimental accuracy of the test. Results are shown in Table VI.

TABLE VI

| Example No. | NaOH (ppm) | % PGI Grafted to nylon (%)[1] | % Un-Grafted PGI (%)[2] | % Total Recovery ("A" + "B") (%)[3] | Film Thickness, mm. | % Haze (%)[4] | % TWLT (%)[4] |
|---|---|---|---|---|---|---|---|
| 18+ | 0 | 0** | 98 | 95.2 | 0.145 | 3.2 | 93.2 |
| 19 | 125 | 0** | 87 | 90.8 | — | — | — |
| 20 | 250 | 0** | 94 | 90.6 | — | — | — |
| 21a | 500 | 7 | 83 | 95.0 | 0.109 | 1.6 | 92.7 |

TABLE VI-continued

| Example No. | NaOH (ppm) | % PGI Grafted to nylon (%)[1] | % Un-Grafted PGI (%)[2] | % Total Recovery ("A" + "B") (%)[3] | Film Thickness, mm. | % Haze (%)[4] | % TWLT (%)[4] |
|---|---|---|---|---|---|---|---|
| 21b | " | 10 | 82 | 96.2 | | | |

+Denotes comparative example.
[1] Percent poly(glutarimide) C to which nylon 6 was grafted (by fractionation, "A" data).
[2] Percent ungrafted poly(glutarimide) C (by fractionation, "B" data).
[3] Percent total mass recovery ("A" + "B"). All numbers unnormalized.
[4] Percent Haze and percent Total White Light Transmittance (Gardner).
**Within the experimental accuracy of the test.

EXAMPLES 22 TO 25

These examples again illustrate the greatly reduced level of grafting seen with poly(glutarimides) containing low levels of acidity. The poly(imide) used in this series (D), having the lowest level of acidity (0.015 mmol/g in 1/1 MDC/methanol), responded with low levels of grafting or none up to 500 ppm NaOH catalyst. In this series a 50/50 weight ratio blend of poly(glutarimide) D and the nylon 6 previously used were reaction extruded in the same manner as above. The percent of poly(glutarimide) to which polyamide was grafted was determined by the solvent fractionation technique. In some samples (**) slight losses in recovery led to slightly less than 0% or more than 100% grafted and ungrafted values; these samples are reported as 0 or 100% within the accuracy of the test. Results are shown in Table VII.

TABLE VII

| Example No. | NaOH (ppm) | % PGI Grafted to nylon (%)[1] | % Un-Grafted PGI (%)[2] | % Total Recovery ("A" + "B") (%)[3] | Film Thickness, mm. | % Haze (%)[4] | % TWLT (%)[4] |
|---|---|---|---|---|---|---|---|
| 22+ | 0 | 0** | 100 | 97.1 | 0.145 | 3.2 | 93.2 |
| 23 | 125 | 0** | 96 | 97.8 | — | — | — |
| 24 | 250 | 6 | 100** | 104.1 | — | — | — |
| 25 | 500 | 0** | 100** | 104.8 | 0.109 | 1.6 | 92.7 |

+Denotes comparative example.
[1] Percent poly(glutarimide) D to which nylon 6 was grafted (by fractionation, "A" data).
[2] Percent ungrafted poly(glutarimide) D (by fractionation, "B" data).
[3] Percent total mass recovery ("A" + "B"). All numbers unnormalized.
[4] Percent Haze and percent Total White Light Transmittance (Gardner).
**Within the experimental accuracy of the test.

TABLE VIII

| Example No. | NaOH (ppm) | % PGI Grafted to nylon (%)[1] | % Un-Grafted PGI (%)[2] | % Total Recovery ("A" + "B") (%)[3] |
|---|---|---|---|---|
| 26+ | 0 | 0** | 99 | 98.3 |
| 27 | 125 | 4 | 88 | 96.1 |
| 28 | 250 | 5 | 86 | 94.5 |
| 29a | 500 | 26 | 65 | 95.4 |
| 29b | " | 24 | 73 | 98.6 |

+Denotes comparative example.
[1] Percent poly(glutarimide) C to which nylon 6·6 was grafted (by fractionation, "A" data).
[2] Percent ungrafted poly(glutarimide) C (by fractionation, "B" data).
[3] Percent total mass recovery ("A" + "B"). All numbers unnormalized.
**Within the experimental accuracy of the test.

EXAMPLES 30 TO 33

These examples again illustrate the greatly reduced

EXAMPLES 26 TO 29

These examples again illustrate the greatly reduced level of grafting seen with poly(glutarimides) containing low levels of acidity. The poly(glutarimide) used in this series (C), having the second lowest level of acidity (0.030 mmol/g in 1/1-MDC/methanol), again responded to grafting only at the higher (500 ppm NaOH) catalyst levels. This series also shows that, again, the nylon 6.6 was more responsive to catalyzed grafting than nylon 6. In this series a 50/50 weight ratio blend of poly(glutarimide) C and the nylon 6.6 previously used were reaction-extruded in the same manner as above. The percentage of poly(glutarimide) to which polyamide was grafted was determined by the solvent fractionation technique. In some samples (**) slight losses in recovery led to slight "negative grafting" levels; these samples are reported as 0% grafting within the experimental accuracy of the test. The fractionation test was run in duplicate on sample 29. Results are shown in Table VIII.

level of grafting seen with poly(glutarimides) containing low levels of acidity. The poly(glutarimide) used in this series (D), had the lowest level of acidity (0.015 mmol/g in 1/1 MDC/methanol); as with the results for this poly(glutarimide) with nylon 6 (examples 22-25), this same poly(glutarimide) with nylon 6.6 did not respond to grafting up to 500 ppm NaOH catalyst. The very small grafting level seen in this series (3-6%) are just inside the error of the test. These results again support the general pattern seen above, that both catalyst and a sufficient level of acidic functionality (i.e. >0.015 mmol/g titer in 1/1 MDC/methanol) are required for the most efficient grafting reaction to occur. However, increasing levels of acidic functionality in the poly(glutarimide), or increasing catalyst levels help enhance grafting even in difficult cases. The film haze values in this series reflect the fact that there is little or no difference in the grafting levels of these materials.

In this series a 50/50 weight ratio blend of poly(glutarimide) D and the nylon 6.6 previously used were reaction extruded in the same manner as above. The percent of poly(glutarimide) to which polyamide was grafted was determined by the solvent fractionation technique. Results are shown in Table IX.

TABLE IX

| Example No. | NaOH (ppm) | % PGI Grafted to nylon (%)[1] | % Un-Grafted PGI (%)[2] | % Total Recovery ("A" + "B") (%)[3] | Film Thickness, mm. | % Haze (%)[4] | % TWLT (%)[4] |
|---|---|---|---|---|---|---|---|
| 30+ | 0 | 6 | 88 | 96.9 | 4.7 | 11.3 | 92.3 |
| 31 | 125 | 6 | 85 | 95.5 | — | — | — |
| 32 | 250 | 3 | 71 | 87.0 | — | — | — |
| 33 | 500 | 3 | 100** | 93.6 | 5.1 | 12.4 | 93.0 |

+Denotes comparative example.
[1] Percent poly(glutarimide) D to which nylon 6 · 6 was grafted (by fractionation, "A" data).
[2] Percent ungrafted poly(glutarimide) D (by fractionation, "B" data).
[3] Percent total mass recovery ("A" + "B"). All numbers unnormalized.
[4] Percent Haze and percent Total White Light Transmittance (Gardner).
**Within the experimental accuracy of the test.

EXAMPLES 34 TO 37

Examples 34 to 37 below show some of the physical properties of the blends prepared in Examples 1 to 4 above. These results show that higher ductility, tensile strength, tensile modulus, and/or toughness can be observed in the ionomer blends. Parts were injection molded from dried pellets into ASTM test pieces and tested dry as molded. Tensile tests were conducted at 100% strain/minute. In addition, films pressed from the catalyzed materials showed little to no stress whitening upon creasing, whereas the uncatalyzed control stress whitened.

TABLE X

| Example No. | NaOH (ppm) | % PGI Grafted to nylon (%)[1] | Preparative Example No. [2] | Tensile Elong. to Yield/ to Break (%) | Tensile Strength to Yield/ to Break (mPa) | Tensile Modulus (GPa) | Relative Work to Break/ Toughness to Break[3] |
|---|---|---|---|---|---|---|---|
| 34− | 0 | 27 | 1− | 5.3/118 | 69.3/59.2 | 2.71 | 2950/9840 |
| 35 | 125 | 33 | 2 | 5.5/160 | 68.4/63.4 | 2.88 | 3990/13300 |
| 36 | 250 | 34 | 3 | 5.4/143 | 67.9/63.7 | 2.71 | 4040/13490 |
| 37 | 500 | 41 | 4 | 5.5/36 | 79.0/69.1 | 3.37 | 1250/4160 |

−Denotes comparative example.
[1] Percent poly(glutarimide) A to which nylon 6 was grafted (by fractionation, "A" data).
[2] poly(glutarimide) graft nylon copolymer from previous example No.
[3] Relative Work Number = (Tensile Stress × % Elongation)/Cross-sectional Area; Relative Toughness Number = (Tensile Stress × % Elongation)/Volume Element

EXAMPLES 38 TO 41

Examples 38 to 41 below show some of the physical properties of the blends prepared in Examples 6 to 9 above. These results show that higher ductility and toughness can be observed in the ionomeric blend samples. Parts were injection molded from dried pellets into ASTM test pieces and tested dry as molded. Tensile tests were conducted at 100% strain/minute. In addition, films pressed from the catalyzed materials showed little-to-no stress whitening upon creasing, whereas the uncatalyzed control stress whitened.

While the invention has been described with reference to specific examples and applications, other modifications and uses for the invention will be apparent to those skilled in the art without departing from the spirit and scope of the invention as defined in the claims.

I claim:

1. A polymer blend comprising a polyamide, an ungrafted poly(glutarimide) and a polyamide-grafted poly(glutarimide) ionomer, the ionomer having polyamide containing —CONH—mers or —CON(alkyl)—mers grafted to the polyglutarimide backbone.

2. The blend of claim 1 wherein the polyamide-grafted poly(glutarimide) ionomer is present at from about 5 to about 95% of the blend.

3. The blend of claim 1 wherein the polyamide-grafted poly(glutarimide) ionomer is present at from about 30 to about 90% of the blend.

4. The blend of claim 1 wherein the polyamide-grafted poly(glutarimide) ionomer is present at from about 40 to about 80% of the blend.

5. The blend of claim 1 wherein the poly(glutarimide) is a poly(N-alkyldimethylglutarimide) and the poly(glutarimide) portion of the polyamide-grafted poly(glutarimide) ionomer contains mers of poly(N-alkyldimethylglutarimide).

TABLE XI

| Example No. | NaOH (ppm) | % PGI Grafted to nylon (%)[1] | Preparative Example No. [2] | Tensile Elong. to Yield/ to Break (%) | Tensile Strength to Yield/ to Break (mPa) | Tensile Modulus (GPa) | Relative Work to Break/ Toughness to Break[3] |
|---|---|---|---|---|---|---|---|
| 38+ | 0 | 33 | 6+ | 8.1/22 | 66.6/54.8 | 2.77 | 559/1865 |
| 39 | 125 | 43 | 7 | 7.5/78 | 66.9/56.4 | 2.75 | 1910/6370 |
| 40 | 250 | 38 | 8 | 8.5/62 | 65.0/47.5 | 2.61 | 1540/5140 |
| 41 | 500 | 45 | 9 | 8.4/78 | 65.8/53.1 | 2.64 | 1920/6430 |

+Denotes comparative example.
[1] Percent poly(glutarimide) B to which nylon 6 was grafted (by fractionation, "A" data).
[2] poly(glutarimide) graft nylon copolymer from previous example No.
[3] Relative Work Number = (Tensile Stress × % Elongation)/Cross-sectional Area; Relative Toughness Number = (Tensile Stress × % Elongation)/Volume Element.

6. The blend of claim 5 wherein the poly(N-alkylglutarimide) is poly(N-methyldimethylglutarimide) and the polyamide-grafted poly(glutarimide) ionomer contains mers of poly(N-methyldimethylglutarimide).

7. The blend of claim 1 wherein the polyamide contains one or more of alkylene, arylene or aralkylene repeating units and one or more terminal amine groups.

8. The blend of claim 7 wherein the polyamide is crystalline and its repeating units are selected from the group consisting of alkylene units having from 4 to 12 carbon atoms, arylene units and aralkylene units having from 7 to 12 carbon atoms.

9. The blend of claim 8 wherein the repeating units of the polyamide are alkylene units having 6 carbon atoms.

10. The blend of claim 9 wherein the polyamide is poly(caprolactam).

11. The blend of claim 9 wherein the polyamide is poly(hexamethylene adipamide).

12. The blend of claim 1 additionally containing a polymeric impact-strength modifier.

13. The blend of claim 12 wherein the impact-strength modifier is a poly(olefin) to which has been grafted acidic functionality or groups that hydrolyze to acids.

14. The blend of claim 13 wherein the poly(olefin) is poly(ethylene).

15. The blend of claim 12 wherein the impact-strength modifier is a core-shell impact-strength modifier having a core of rubbery polymer comprising primarily mers selected from the group consisting of butadiene and alkyl acrylates having from three to eight carbon atoms in the alkyl group, and grafted thereto one or more shells comprising a majority of mers selected from the group consisting of vinylaromatic, alkyl methacrylate and cycloalkyl methacrylate mers.

16. The blend of claim 12 containing one or more additional additives to modify useful properties of the blend, wherein the one or more additional additives are selected from the group consisting of antioxidants, heat stabilizers, ultraviolet-light stabilizers, lubricants, mold-release agents and flame retardants.

17. The blend of claim 12 additionally containing an inert filler material.

18. A process for preparing a blend containing a polyamide having at least one terminal or pendant primary amine group, a poly(glutarimide) and a polyamide-grafted poly(glutarimide) ionomer, the ionomer having polyamide containing —CONH— mers or —CON(alkyl)— mers grafted to the polyglutarimide backbone, which process comprises reacting the polyamide and the poly(glutarimide) at elevated temperature and in the presence of a catalytic amount of a base.

19. The process of claim 18 wherein the ratio of polyamide to poly(glutarimide), prior to formation of the ionomer, is from about 95:5 to about 5:95.

20. The process of claim 19 wherein the amount of polyamide-grafted poly(glutarimide) ionomer formed is from about 5 to about 95% of the blend.

21. The process of claim 18 wherein the ratio of polyamide to poly(glutarimide), prior to formation of the ionomer, if from about 30:70 to about 90:10.

22. The process of claim 21 wherein the amount of polyamide-grafted poly(glutarimide) ionomer formed is from about 30 to about 90% of the blend.

23. The process of claim 18 wherein the ratio of polyamide to poly(glutarimide), prior to formation of the ionomer, is from about 40:60 to about 85:15.

24. The process of claim 22 wherein the amount of polyamide-grafted poly(glutarimide) ionomer formed is from about 40 to about 85% of the blend.

25. The process of claim 18 wherein the polyamide and the poly(glutarimide) are melted and mixed together at a temperature from about 240° C. to about 350° C.

26. The process of claim 25 wherein the temperature is from about 260° C. to about 320° C.

27. The process of claim 18 wherein the polyamide and the poly(glutarimide) are reacted in solution at a temperature from about 100° C. to about 350° C.

28. The process of claim 27 wherein the solution is a solution in a $C_1$-$C_8$ aliphatic alcohol.

29. The process of claim 27 wherein the solution is a solution in a mixed solvent of a $C_1$-$C_8$ aliphatic alcohol and an aromatic hydrocarbon.

30. The process of claim 27 wherein the solution is a solution in a mixed solvent of a $C_1$-$C_8$ aliphatic alcohol and cresol.

31. The process of claim 18 wherein the amount of base is from about 100 to about 10,000 parts per million based on the total amount of polymer present.

32. The process of claim 18 wherein the amount of base is from about 200 to about 1000 parts per million based on the total amount of polymer present.

* * * * *